Figure 4:
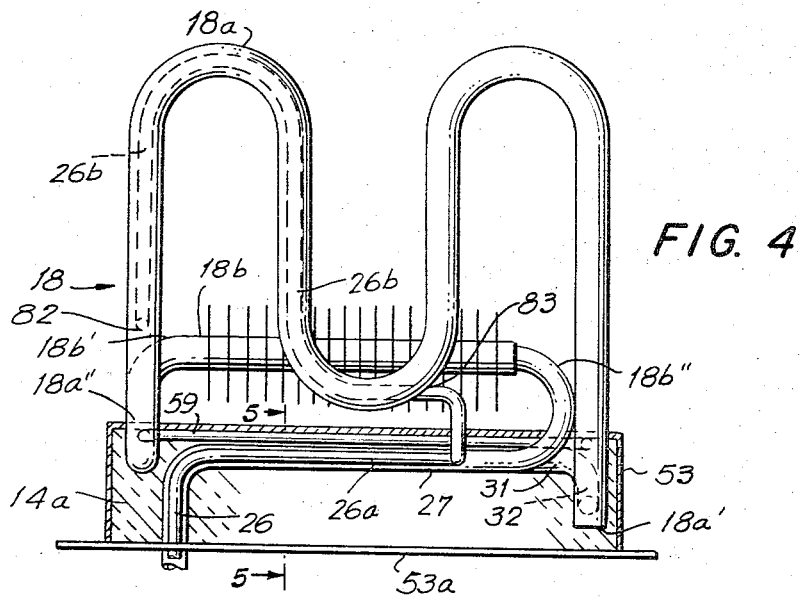

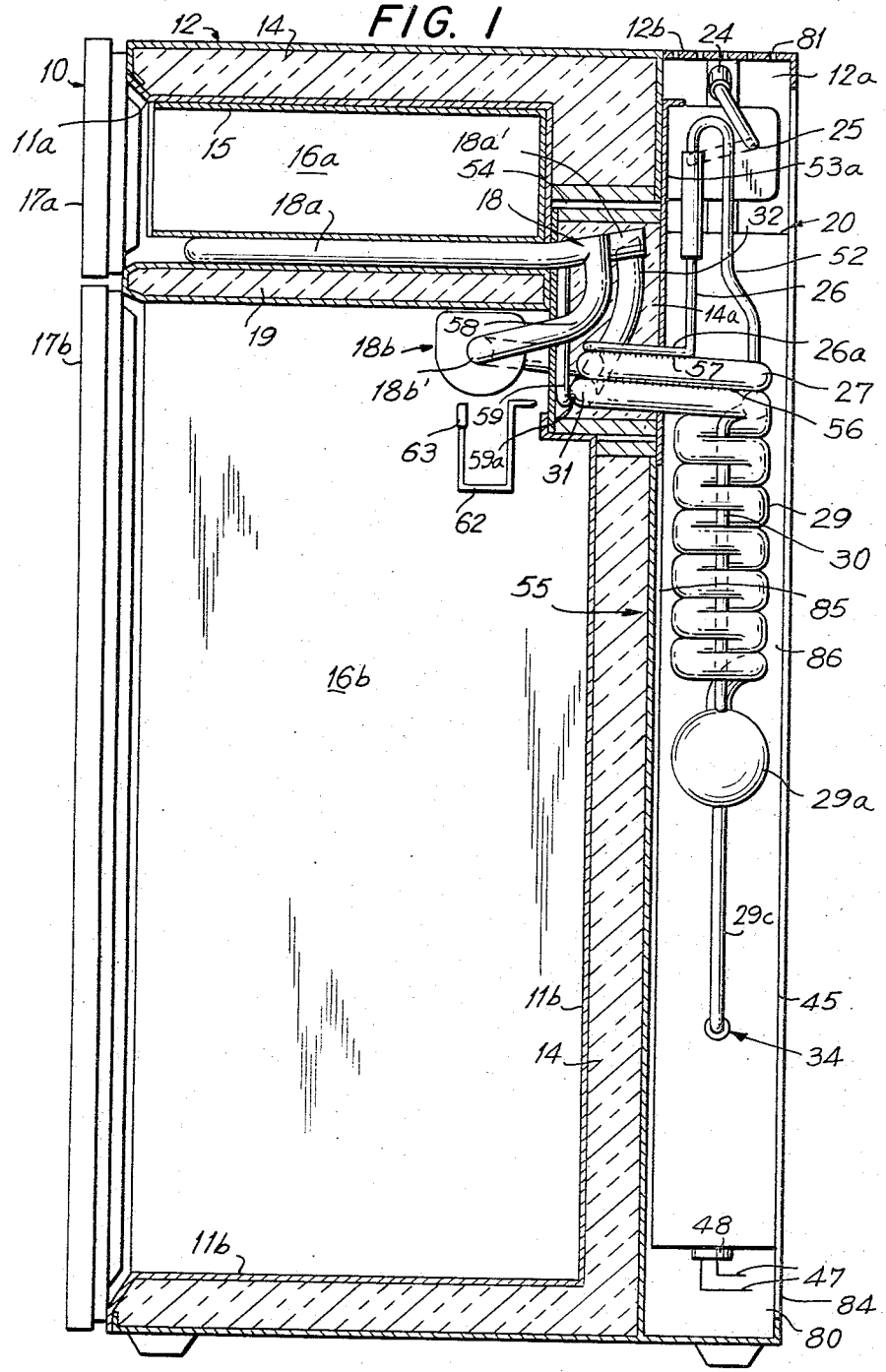

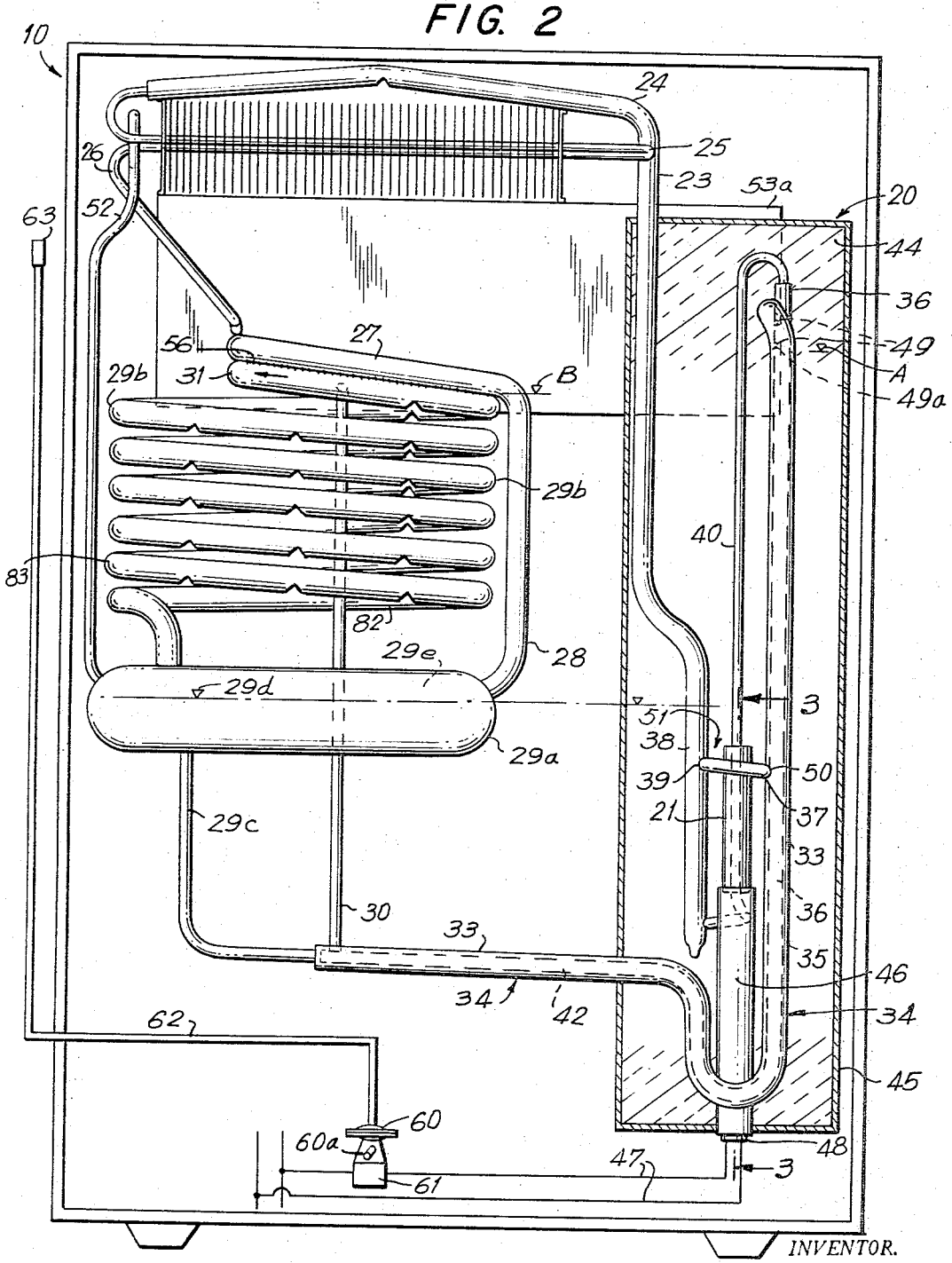

INVENTOR.
Lars Svint Enger his ATTORNEY

United States Patent Office 3,338,066
Patented Aug. 29, 1967

3,338,066
ABSORPTION REFRIGERATION
Lars Sivert Enger, Farsta, Sweden, assignor to Aktiebolaget Electrolux, Stockholm, Sweden, a corporation of Sweden
Filed Dec. 21, 1965, Ser. No. 515,386
Claims priority, application Sweden, Dec. 23, 1964, 15,643/64
10 Claims. (Cl. 62—141)

My invention relates to absorption refrigeration, and more particularly to an absorption refrigeration system of a uniform pressure type in which refrigerant fluid evaporates in the presence of an inert pressure equalizing gas.

It is an object of my invention to improve the operation of systems of this type, particularly to effect a lower refrigeration temperature. I accomplish this by flowing inert gas in an evaporator in a first path of flow which is in heat exchange relation with a second path of flow, conducting liquid refrigerant to the second path of flow, and, after the liquid has passed in heat exchange relation with the first path of flow, flowing such liquid in the first path of flow.

In the preferred embodiment of the invention disclosed herein, the first path of flow defines a low temperature evaporator section forming part of a circuit for circulating inert gas between an evaporator and an absorber, and the second path of flow constitutes part of a supply line for conducting liquid refrigerant from a condenser to the low temperature evaporator section. Liquid refrigerant in the second path of flow, after passing in heat exchange relation with gas in the first path of flow, may flow countercurrent to gas in the first path of flow defining the low temperature evaporator section. Thereafter, the liquid refrigerant flows in parallel flow with inert gas in a third path of flow which defines a higher temperature evaporator section and receives inert gas from the first path of flow. In the circulating gas circuit, inert gas enriched in refrigerant and flowing from the third path of flow to the absorber flows in heat exchange relation with inert gas weak in refrigerant and flowing from the absorber to the first path of flow.

Another object of my invention is to improve the operation of systems of this type having low and higher temperature evaporator sections, whereby the average or mean temperature of the low temperature evaporator section is lowered and the mean temperature differential between the low temperature evaporator section and the higher temperature evaporator section is increased. I accomplish this by flowing liquid refrigerant in the supply line to the second path of flow in heat exchange relation with inert gas enriched in refrigerant before such liquid is introduced into the second path of flow. Further, liquid refrigerant passing from the first path of flow defining the low temperature evaporator section flows in heat exchange relation with inert gas weak in refrigerant and flowing to the first path of flow before such liquid is introduced into the third path of flow defining the higher temperature evaporator section. With the circuit arrangement provided, effective precooling of liquid refrigerant and inert gas flowing to the low temperature evaporator section is obtained to precool these fluids to the lowest possible temperature. Due to the heat exchange effected between liquid refrigerant and gas weak in refrigerant before these fluids respectively flow to the higher temperature evaporator section and to the low temperature evaporator section, liquid refrigerant is introduced into the higher temperature evaporator section at a higher temperature than it would if entering directly from the low temperature evaporator section. This increases the mean or average temperature of the higher temperature evaporator section. Thus, by reducing the mean or average temperature of the low temperature evaporator section and increasing the mean or average temperature of the higher temperature evaporator section, a wide temperature differential of the mean or average temperatures of the two evaporator sections is effected.

Further objects and advantages of my invention will become apparent as the following description proceeds, and the features of novelty which characterize my invention will be pointed out with particularity in the claims annexed to and forming a part of this specification.

Figure 3:
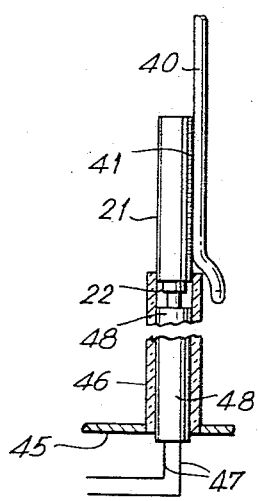
Figure 5:
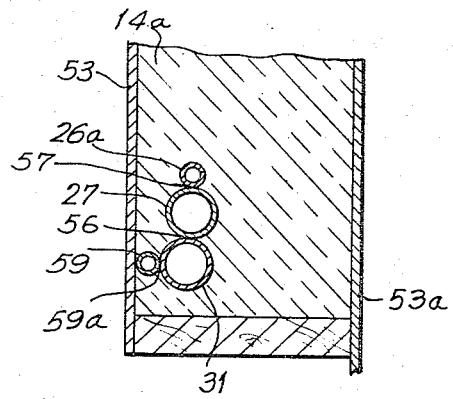

For a better understanding of my invention, reference may be had to the following description taken in connection with the accompanying drawing in which FIG. 1 is a side view, in section, of a household refrigerator embodying my invention; FIG. 2 is a rear elevational view, partly broken away and in section, of the refrigerator shown in FIG. 1; FIG. 3 is a fragmentary sectional view taken at line 3—3 of FIG. 2; FIG. 4 is a top plan view, partly broken away and in section, of parts of the refrigeration system and removable rear insulated wall section shown in FIG. 1 with the cabinet details omitted; and FIG. 5 is a fragmentary sectional view taken at line 5—5 of FIG. 4.

Referring to FIGS. 1 and 2, I have shown my invention in connection with a household refrigerator comprising a cabinet 10 having top and bottom inner liners 11a and 11b arranged to be supported within an outer shell 12 and insulated therefrom at 14 in any suitable manner. Within the top inner liner 11a is disposed a metal shell 15 which defines a thermally insulated freezer space 16a, and the bottom inner liner 11b defines a food storage space 16b for storing food at a higher temperature than in the space 16a and preferably at a temperature above 0° C. Access to the spaces 16a and 16b is afforded at front openings which are adapted to be closed by insulated doors 17a and 17b hinged in any suitable manner (not shown) at the front of the refrigerator cabinet 10.

The freezer space 16a is arranged to be cooled by an evaporator section 18a in the form of a horizontally disposed coil having portions thereof in good thermal contact with the bottom of the metal shell 15. The food storage space 16b, which is separated from the freezer space 16a by a horizontal insulated partition 19, is arranged to be cooled by an evaporator section 18b below which a drip tray (not shown) may be supported in any suitable manner.

The evaporator sections 18a and 18b form low and higher temperature sections of a cooling unit 18 of an absorption refrigeration system of the inert gas type. A refrigeration system of this type comprises a generator 20 containing a refrigerant, such as ammonia, in solution in a body of absorption liquid, such as water. As shown in FIGS. 2 and 3, heat is supplied to the generator 20 from a heating tube 21 which may be heated by an electrical heating element 22, for example, which is disposed within the tube. The heat supplied to the generator 20 and absorption solution therein expels refrigerant vapor out of solution, and, in a manner to be described hereinafter, refrigerant vapor passes upward from the generator through a vapor supply line or conduit 23 and an air-cooled rectifier 24 into an air-cooled condenser 25 in the form of a coil having fins fixed thereto. Refrigerant vapor is liquefied in the condenser 25 by surrounding cool air which flows in physical contact therewith, and the liquefied refrigerant flows through a conduit 26 into the cooling unit 18 in which it evaporates and diffuses into an inert pressure equalizing gas, such as hydrogen, which enters through a conduit 32. Due to evaporation of refrigerant fluid into inert gas in cooling unit 18, a refrigerating effect is produced with consequent absorption of heat from the surroundings.

The rich gas mixture of refrigerant and inert gas formed in cooling unit 18 flows from the lower evaporator section 18*b* thereof through conduits 27 and 28 into an air-cooled absorber comprising a vessel 29*a* and a looped coil 29*b*. In the absorber vessel 29*a* and coil 29*b* the rich gas mixture flows counter-current to downwardly flowing absorption liquid which enters through a conduit 30. The absorption liquid absorbs refrigerant vapor from inert gas, and inert gas weak in refrigerant flows from absorber coil 29*b* in a path of flow including conduits 31 and 32 into the upper evaporator section 18*a* of cooling unit 18.

The circulation of gas in the gas circuit just described is due to the difference in specific weight of the columns of gas rich and weak, respectively, in refrigerant vapor. Since the column of gas rich in refrigerant vapor and flowing from cooling unit 18 to the absorber vessel 29*a* is heavier than the column of gas weak in refrigerant and flowing from the absorber coil 29*b* to cooling unit 18, a force is produced or developed within the system for causing circulation of inert gas in the manner described.

Enriched absorption liquid or absorption solution flows from the lower end of the absorber vessel 29*a* through a conduit 29*c* and an outer passage 33 of a liquid heat exchanger 34 which, within the generator 20, includes an outer vertical pipe 35 and an inner vertical pipe 36. Enriched absorption liquid flows from the passage 33 through an upwardly inclined connection 37 into a vertical standpipe 38. The upper end of the inclined connection 37 is connected to the pipe 38 at a point 39 which is at a level below the liquid surface level of the column of liquid held in the pipe 38.

The extreme lower end of the pipe 38 is connected to the lower end of a pump pipe or vapor lift tube 40 in thermal exchange relation with the heating tube 21 at 41, as by welding, for example. Liquid is raised by vapor-lift action through the tube or pump pipe 40 into the upper part of the pipe 36.

The absorption liquid from which refrigerant vapor has been expelled flows downward through the inner pipe 36, the latter extending through the liquid heat exchanger 34 and forming an inner passage 42 thereof. The pipe 36 is connected to the conduit 30 through which weak absorption liquid is introduced into the upper end of the absorber coil 29*b*. The circulation of absorption solution in the liquid circuit just described is effected by raising of liquid through the pump pipe 40 from a low level to a higher level A in pipe 36, as shown in FIG. 2. Absorption liquid flows by gravity from level A in the generator 20 and passes from the upper end of conduit 30 into the upper end of the absorber coil 29*b* at the level B.

The generator 20, together with a part of the liquid heat exchanger 34, are embedded in a body of insulating material 44 retained in a metal shell or casing 45 having an opening at the bottom thereof. The electrical heating element 22 is arranged to be positioned within the heating tube 21 through a hollow sleeve member 46 which is formed of insulating material and extends downward from the bottom of the heating tube 21 to the bottom opening in the shell 45. Electrical conductors 47 for the electrical heating element 22 extend through one or more apertured insulating members 48 held in the hollow sleeve 46. The heating tube 21 snugly receives the heating element 22 which may comprise a cartridge having an electrical wire or the like having a relatively high resistance that generates heat when connected to a source of electrical energy.

In the operation of the refrigeration system of FIG. 2, vapor generated in the vapor lift pipe 40 flows from the upper end thereof to a gas separation chamber 49*a* at the extreme upper end of the standpipe 36 and passes through openings 49 in the side wall thereof, at the chamber 49*a*, into the outer passage 33 formed between the inner and outer standpipes 36 and 35, respectively. The vapor in the passage 33 depresses the liquid level therein to a point 50 and flows through enriched absorption liquid in an analyzer 51 which includes the upwardly inclined connection 37 and top part of the liquid column in the pipe 38. The generated vapor from the passage 33 flows through liquid in the analyzer 51 by bubble action. In bubbling through the enriched solution, absorption liquid vapor accompanying refrigerant vapor is cooled sufficiently and condenses and in this way is removed from refrigerant vapor. The refrigerant vapor flowing from the analyzer 51 passes through the upper part of the standpipe 38 and vapor supply line 23 to the condenser 25, as previously explained. The outlet end of the condenser 25 is connected by a conduit 52 to a part of the gas circuit, as to the absorber vessel 29*a*, for example, so that any inert gas which may pass through the condenser 25 can flow to the gas circuit. The conduit 52 at its lower end is connected to the vessel 29*a* at a region above the liquid surface level 29*d* therein, whereby uncondensed refrigerant can flow into the vapor space 29*e* of the vessel and displace a mixture of refrigerant vapor and inert gas therefrom. The displaced inert gas in the mixture becomes effective to increase the total pressure in the system, so that an adequate condensing pressure will be obtained in the condenser 25 for the prevailing temperature of the ambient air.

With the cooling unit 18 positioned in the interior of the cabinet 10, the other components of the refrigeration apparatus are disposed in a vertically extending apparatus space 80 at the rear of the cabinet which is defined by the rear portions 12*a* of the lateral side walls of the outer shell 12, which project rearward beyond the rear insulated wall 55; and by the rear portion 12*b* of the top of the outer shell 12, which also projects beyond the rear insulated wall 55 and is apertured at 81. Natural draft is produced in the space 80 and causes upward circulation of ambient air due to heat radiated by the absorber vessel 29*a* and coil 29*b* and condenser 25, so that surrounding cool air can flow directly over their surfaces and assure adequate cooling of these parts. The bottom of the space 80 is open and the top is apertured at 81, as just explained, to enable air to freely flow upward in the space 80.

A control device 60 is operatively associated with a switch 61 connected in one of the conductors 47 for supplying electrical energy to heating element 22. The control device 60 is thermostatically controlled and is provided with a capillary tube 62 and thermal sensitive bulb 63 adapted to contain a suitable volatile fluid, the bulb 63 being arranged to be influenced by the temperature of air in the space 16*b* which is cooled by the higher temperature evaporator section 18*b*. The control device 60 functions to control switch 61 responsive to a temperature condition affected by the higher temperature evaporator section 18*b* of the cooling unit 18 and may be provided with a control knob 60*a* to adjust the temperature at which it is desired to maintain the higher temperature evaporator section 18*b*.

As best shown in FIGS. 1, 2 and 4, the conduits 27 and 31 are U-shaped and have closed ends seen in FIG. 1 and pairs of spaced arms or legs, one pair of which is disposed within a body of insulation 14*a* retained in a removable wall section 53 to facilitate the insertion of the cooling unit 18 within the cabinet 10, such removable wall section 53 having an outer rectangular sheet 53*a* which overlaps the opening 54 in which the removable wall section 53 fits and is secured in any suitable manner (not shown) to the outer surface of the rear insulated wall 55 of the cabinet 10.

The U-shaped conduit 27 is disposed above the U-shaped conduit 31 and heat conductively connected thereto at 56, as by welding, for example, to form a gas heat exchanger for flowing gas rich and weak in refrigerant, respectively, in heat exchange relation. Further, the conduit 26 through which liquid refrigerant is supplied to the cooling unit 18 from the condenser 25 includes an L-shaped part 26a which is heat conductively connected at 57 to the top conduit 27, as by welding, for example, as shown in FIGS. 1 and 4.

Gas weak in refrigerant flows through conduits 31 and 32 to one end 18a' of the low temperature evaporator section 18a and flows through the latter to the opposite end 18a" thereof. Liquid refrigerant in the conduit 26 flows successively through the L-shaped part 26a thereof and then a looped part 26b thereof to a region 82 of the low temperature evaporator section 18a. Liquid refrigerant introduced into the low temperature evaporator section 18a at the region 82 flows by gravity therefrom toward the end 18a' thereof, the refrigerant flowing counter-current to the inert gas which flows from the end 18a' to the opposite end 18a" of the evaporator section 18a.

Inert gas flows from the end 18a" of the low temperature evaporator section 18a through a downwardly sloping connection 58 to one end 18b' of the higher temperature evaporator section 18b for flow therethrough. Liquid refrigerant flows from the end 18a' of the low temperature evaporator section 18a through a conduit 59 to the connection 58 for gravity flow through the higher temperature evaporator section 18b in parallel flow with the inert gas. The mixture of inert gas and refrigerant formed in the cooling unit 18 flows therefrom from the end 18b" of the higher temperature evaporator section 18b through conduits 27 and 28 to the absorber vessel 29a, as explained above. Unevaporated refrigerant flowing from the outlet end 18b" of the higher temperature evaporator section 18b also flows through the conduits 27 and 28 to the absorber vessel 29a.

Since the inert gas flows successively through the evaporator sections 18a and 18b, the gas in the top evaporator section 18a contains a lesser amount of refrigerant vapor than the gas in the bottom evaporator section 18b. The partial vapor pressure of the refrigerant is a gradient, so that the temperature of liquid refrigerant in the evaporator sections is also a gradient, the evaporating temperature of the liquid being lower in the top evaporator section 18a which, as explained above, constitutes the freezing portion of the cooling unit 18.

In accordance with my invention, in order to obtain a lower temperature in the low temperature evaporator section 18a, liquid refrigerant from the condenser 25 is conducted through the L-shaped part 26a of the conduit 26 to the looped part 26b thereof which extends lengthwise within the evaporator section 18a from a region 83 to the region 82 thereof. Inert gas flows from the end 18a' to the opposite end 18a" of the evaporator section 18a which is in heat exchange relation with a second path of flow formed by the looped part 26b of the liquid refrigerant supply line. As just explained, liquid refrigerant is conducted through the second path of flow formed by the looped part 26b, and, after the liquid has passed in heat exchange relation with the first path of flow from the region 83 to the region 82, such liquid flows in the presence of inert gas in the first path of flow formed by the evaporator section 18a. The liquid refrigerant flows in the first path of flow in physical contact with the inert gas and in heat exchange relation and out of physical contact with the liquid refrigerant in the second path of flow formed by the conduit 26b. The liquid refrigerant passing from the outlet at the end of the looped part 26b of the conduit 26 at the region 82 reverses its direction of flow and flows by gravity in the opposite direction toward the end 18a' of the evaporator section 18a in a direction counter-current to inert gas.

The liquid refrigerant conducted through the looped part 26b of the conduit 26 is effectively precooled before it flows into the presence of inert gas in the evaporator section 18a. Since inert gas weak in refrigerant and flowing through conduits 31 and 32 to the end 18a' of the evaporator section 18a flows in heat exchange relation with cool inert gas enriched in refrigerant and flowing from the bottom evaporator section 18b through conduit 27 toward the absorber vessel 29a, the weak inert gas introduced into the end 18a' of the top evaporator section 18a for flow therethrough is effectively precooled.

Before liquid refrigerant flows through the looped part 26b of the conduit 26, such liquid flows through the L-shaped part 26a thereof which, as explained above also is in heat exchange relation with the conduit 27 through which cool inert gas enriched in refrigerant flows toward the absorber vessel 29a from the bottom evaporator section 18b, as shown in FIG. 4. It will now be understood that the L-shaped part 26a for liquid refrigerant is in heat exchange relation with the top part of the conduit 27 and that the conduit 31 for inert gas weak in refrigerant is in heat exchange relation with the bottom part of the conduit 27, as shown in FIG. 5. Therefore, cool inert gas enriched in refrigerant and flowing through the conduit 27 is employed to effect precooling of both liquid refrigerant and inert gas introduced into the top evaporator section 18a.

As explained above, unevaporated liquid refrigerant flows by gravity from the end 18a' of the top evaporator section 18a through the conduit 59 to the end 18b' of the bottom evaporator section 18b for flow therethrough. The conduit 59 is U-shaped and the liquid therein provides a liquid seal to prevent flow of inert gas therethrough. As seen in FIG. 1, the near vertical leg of the U-shaped conduit 59 is connected at its upper end to the connection 58 from which liquid flows downward to the end 18b' of the bottom evaporator section 18b. As best shown in FIG. 5, the elongated bottom or closed end of the U-shaped conduit 59 is heat conductively connected to the conduit 31 at 59a, as by welding, for example.

It will now be understood that relatively cool liquid refrigerant withdrawn from the low temperature evaporator section 18a flows in heat exchange relation with inert gas weak in refrigerant and flowing toward the evaporator section 18a before the withdrawn liquid is introduced from conduit 59 into the higher temperature evaporator section 18b. With this arrangement, heat is transferred from inert gas weak in refrigerant before it enters evaporator section 18a to the cool liquid leaving the evaporator section 18a and to the cool inert gas enriched in refrigerant and flowing through conduit 27, thereby lowering the temperature of the weak inert gas entering the evaporator section 18a. By cooling the weak inert gas in this manner before it enters the evaporator section 18a and by cooling the liquid refrigerant before it enters the evaporator section 18a and also in the evaporator section 18a before it is introduced into the presence of inert gas therein, the mean or average temperature of the evaporator section 18a is lowered, thereby improving the operation of this part of the cooling unit 18 to obtain a lower freezing temperature therein.

Due to heat exchange effected between the weak inert gas in conduit 31 and the liquid refrigerant in conduit 59, liquid is introduced into the bottom evaporator section 18b at a higher temperature than it would if entering directly from the evaporator section 18a. With this arrangement, the mean or average temperature of the higher temperature evaporator section 18b is increased. Accordingly, by reducing the mean temperature of the freezing section 18a of the cooling unit 18 and raising the mean temperature of the space cooling evaporator section 18b thereof, a wide temperature differential of the mean temperatures of the two sections 18a and 18b is effected.

The temperature at which liquid evaporates and diffuses in the gas mixture at the region 82 of the evaporator section 18a is dependent upon the partial pressure of refrigerant vapor in the gas mixture. When the temperature of the liquid refrigerant introduced into the evaporator section 18a is higher than the temperature at which evaporation of liquid takes place, heat is absorbed from the liquid with evaporation thereof to bring down its temperature.

By precooling the liquid introduced into the evaporator section 18a, less of the refrigerating effect is utilized to bring down the temperature of the liquid and a lower mean or average temperature is maintained in evaporator section 18a. By increasing the temperature of the cool liquid refrigerant flowing in conduit 59 from evaporator section 18a before such liquid is introduced into the bottom evaporator section 18b, refrigerating effect in the latter is utilized to absorb heat from the liquid refrigerant after it flows in heat exchange relation with the weak inert gas in conduit 31, whereby the mean or average temperature in the bottom evaporator section 18b is increased.

Let us assume that an air-cooled refrigeration system like that shown and just described is charged with ammonia, hydrogen and water so that the system will operate in a satisfactory manner in ambient air at a normal temperature range of about +32° C. With these conditions liquid condensate formed in the condenser 25 and introduced into conduit 26 is at a temperature of about +50° C. After flowing through the L-shaped part 26a of the conduit 26, in heat exchange relation with conduit 27 through which flows cool inert gas enriched in refrigerant, the temperatures of the liquid condensate decreases about 53° C. from +50° C. to −3° C. During its flow through the looped part 26b of conduit 26, which extends within the evaporator section 18a, a further reduction in the temperature of the liquid refrigerant is effected; and, at the region 82 at which it is introduced into the presence of inert gas, the liquid refrigerant is at a temperature of about −23° C.

The gas mixture at the region 82 under ordinary operating conditions most likely will be at a temperautre which is a few degrees centigrade below the temperature of the liquid refrigerant passing from the end of the looped part 26b at 82. As explained above, liquid refrigerant flows counter-current to inert gas in evaporator section 18a from the region 82 to the end 18a' of the evaporator section. At the end 18a' of the evaporator section the temperature of the liquid refrigerant is reduced further and in the neighborhood of about −19° C. and about at the same temperature as the inert gas which flows from the end 18a' to the opposite end 18a'' of the evaporator section 18a. The inert gas then flows through the bottom evaporator section 18b into conduit 27 which, as shown in FIG. 5, is in the heat exchange relation with both the L-shaped part 26a of the conduit 26 and the conduit 31 through which flows weak inert gas to the end 18a' of the evaporator section 18a.

Liquid refrigerant passing into conduit 59 from the end 18a' of the top evaporator section 18a, which is extremely cool, now flows in heat exchange relation with weak inert gas in conduit 31, whereby heat is transferred from the weak gas to liquid refrigerant before it is introduced into the bottom evaporator section 18b. With this arrangement, the weak inert gas is cooled before it enters the end 18a' of the top evaporator section 18a through the conduit 32. Cooling of the weak inert gas in this manner makes it possible to cool liquid refrigerant in the looped part 26b of the conduit 26, whereby the temperature of the liquid refrigerant will be reduced to about a temperature of −23° C. at the region 82 at which the liquid refrigerant is introduced into the pressure of inert gas. Due to transfer of heat from weak inert gas to liquid refrigerant in the conduit 59 before the liquid is introduced in the bottom evaporator section 18b, the mean temperature in the latter is increased. Under the operating conditions assumed above, the temperature of the bottom evaporator section 18b at the one end 18b' is about −13° C. and at the opposite end 18b'' is about −6° C.

Modifications of the embodiment of the invention which I have described and illustrated will occur to those skilled in the art, so that I do not desire to be limited to the particular arrangement set forth. Therefore, I intend in the claims to cover all those modifications and features which do not depart from the spirit and scope of my invention.

I claim:
1. In the method of refrigerating with a system employing inert gas in which liquid refrigerant evaporates, the improvement which comprises the steps of
   (a) flowing inert gas in a first path of flow,
   (b) flowing liquid refrigerant in a second path of flow in heat exchange relation and out of physical contact with the inert gas in said first path of flow, and,
   (c) after the liquid refrigerant in said second path of flow has passed in heat exchange relation and out of physical contact with the inert gas in said first path of flow, flowing such liquid refrigerant in said first path of flow
      (1) in heat exchange relation and out of physical contact with the liquid refrigerant in said second path of flow and
      (2) in physical contact with the inert gas.

2. In the method set forth in claim 1, the improvement which comprises the step of flowing the liquid refrigerant in said first path of flow in a direction countercurrent to the flow of the inert gas therein.

3. In the method set forth in claim 1, the improvement which comprises the steps of
   (a) flowing the inert gas in said first path of flow from a first region to a second region removed therefrom,
   (b) flowing the liquid refrigerant in said second path of flow in a first direction away from the first region to the second region, and,
   (c) after the liquid refrigerant in said second path of flow has passed in heat exchange relation and out of physical contact with the inert gas in said first path of flow, reversing the direction of flow of such liquid refrigerant at the second region and flowing the liquid refrigerant in a second opposite direction in said first path of flow from the second region toward the first region.

4. In the method of refrigerating with a system in which inert gas flows toward and from first and second places in which liquid refrigerant evaporates in the presence of the inert gas, the improvement which comprises the steps of
   (a) flowing liquid refrigerant to the first place for evaporation therein in the presence of the inert gas to produce a first refrigerating effect,
   (b) conducting liquid refrigerant from the first place in a path of flow which is out of physical contact with the inert gas and in heat exchange relation with the inert gas flowing toward the first place to transfer heat fromt he last-mentioned inert gas to the liquid refrigerant, and
   (c) thereafter flowing the heated liquid refrigerant to the second place for evaporation therein in the presence of the inert gas to produce a second refrigerating effect.

5. In the method set forth in claim 4, the inprovement which comprises the steps of
   (a) flowing inert gas successively through the first and second places,
   (b) flowing the inert gas in a first path of flow in the first place,
   (c) flowing liquid refrigerant toward the first place
      (1) in a third path of flow which is out of physical contact with the inert gas and in heat exhange relation with the inert gas flowing from the second place and then
      (2) in a second path of flow which is in heat exchange relation and out of physical contact with the inert gas in the first path of flow, and,
   (d) after the liquid refrigerant in the second path of flow has passed in heat exchange relation and out of physical contact with the inert gas in the first path of flow, flowing such liquid refrigerant in the first path of flow
(1) in heat exchange relation and out of physical contact with the liquid refrigerant in the second path of flow and
(2) in the presence of the inert gas for evaporation therein to produce the first refrigerating effect.

6. In a refrigerating system of the class described having, in combination,
(a) an evaporator in which liquid refrigerant evaporates into inert gas,
(b) an absorber,
(c) a circuit for circulating inert gas between said absorber and said evaporator,
(d) means for conducting liquid refrigerant to said evaporator,
(e) said evaporator comprising piping providing an elongated path of flow for inert gas,
(f) the liquid refrigerant conducting means including a conduit which extends lengthwise of said piping between spaced first and second regions thereof and functions to conduct liquid refrigerant therethrough in one direction from the first region to the second region in heat exchange relation with and out of physical contact with inert gas flowing through said piping,
(g) said conduit having an outlet at the second region for conducting liquid refrigerant therefrom into the presence of inert gas in said piping,
(h) the elongated path of flow provided by said piping functioning to reverse the direction of flow of liquid refrigerant conducted into said piping at the second region and promote gravity flow of liquid refrigerant in said piping in the presence of the inert gas in a second opposite direction from the second region toward the first region thereof.

7. A refrigerating system as set forth in claim 6 in which said circuit for circulating inert gas functions to flow inert gas through said piping from the first region to the second region thereof in a direction countercurrent to the flow of liquid refrigerant in said piping in the presence of inert gas from the second region toward the first region thereof.

8. A refrigerating system as set forth in claim 6 in which said liquid refrigerant conduit extends lengthwise of and within said piping providing the elongated path of flow for inert gas.

9. A refrigerating system as set forth in claim 6 in which
(a) said evaporator comprises a first evaporator section and
(b) said inert gas circuit includes a second evaporator section connected to receive inert gas from said first evaporator section,
(c) means including a second conduit for conducting liquid refrigerant from said first evaporator section to said second evaporator section,
(d) said second conduit functioning to conduct liquid refrigerant therethrough out of the presence of the inert gas, and
(e) said second conduit being in heat exchange relation with a part of said inert gas circuit at a higher temperature than the liquid refrigerant conducted through said second conduit during normal operation of the system, whereby heat is transferred from inert gas in said part of said gas circuit to liquid refrigerant in said second conduit.

10. A refrigerating system as set forth in claim 6 in which said piping providing the elongated path of flow has an inlet and an outlet for inert gas, the first region of said piping being disposed between the inert gas inlet and outlet and removed from the inert gas inlet, the second region of said piping being nearer to the inert gas outlet than to the inert gas inlet, and said piping having an outlet for liquid refrigerant which is disposed between the inert gas inlet and the first region of said piping.

References Cited
UNITED STATES PATENTS

| | | | |
|---|---|---|---|
| 1,822,224 | 9/1931 | Knight | 62—103 |
| 2,794,331 | 6/1957 | Kogel | 62—148 |
| 3,020,725 | 2/1962 | Kogel | 62—141 |
| 3,177,675 | 4/1965 | Kogel | 62—148 |

LLOYD L. KING, *Primary Examiner.*